(12) United States Patent
Kragh et al.

(10) Patent No.: US 8,314,525 B2
(45) Date of Patent: Nov. 20, 2012

(54) ACTUATOR WITH ELECTRICAL EQUIPMENT ENCLOSED IN A SEPARATE ENCLOSURE MADE OF A FIRE RESISTANT

(75) Inventors: Tom T. Kragh, Sønderborg (DK); René Sørensen, Gråsten (DK); Finn Jacobsen, Nordborg (DK)

(73) Assignee: Linak A/S, Nordborg (DK)

( * ) Notice: Subject to any disclaimer, the term of this patent is extended or adjusted under 35 U.S.C. 154(b) by 52 days.

(21) Appl. No.: 11/991,174

(22) PCT Filed: Sep. 8, 2006

(86) PCT No.: PCT/DK2006/000497
§ 371 (c)(1),
(2), (4) Date: Feb. 28, 2008

(87) PCT Pub. No.: WO2007/028395
PCT Pub. Date: Mar. 15, 2007

(65) Prior Publication Data
US 2009/0256440 A1 Oct. 15, 2009

(30) Foreign Application Priority Data
Sep. 9, 2005 (DK) .................................. 2005 01265

(51) Int. Cl.
*H02K 5/00* (2006.01)
*H02K 5/12* (2006.01)
*H02K 5/10* (2006.01)
*H02K 7/10* (2006.01)

(52) U.S. Cl. .................. 310/88; 310/87; 310/89; 310/83

(58) Field of Classification Search .................... 310/83, 310/87, 88, 89; *H02K 7/10, 5/10, 5/12*
See application file for complete search history.

(56) References Cited

U.S. PATENT DOCUMENTS

| 3,707,637 A | 12/1972 | Charlton et al. | |
|---|---|---|---|
| 4,429,247 A * | 1/1984 | Feldman | 310/322 |
| 4,584,902 A | 4/1986 | Fry | |
| 4,722,809 A * | 2/1988 | Andrews et al. | 252/609 |
| 5,773,533 A | 6/1998 | Horold | |
| 6,107,717 A * | 8/2000 | Lin et al. | 310/90 |
| 6,392,322 B1 | 5/2002 | Mares et al. | |
| 7,291,951 B2 * | 11/2007 | Takiguchi et al. | 310/75 R |
| 7,489,296 B2 * | 2/2009 | Nishino et al. | 345/157 |
| 8,212,443 B2 * | 7/2012 | Chen et al. | 310/89 |
| 2002/0109426 A1 * | 8/2002 | Peter et al. | 310/89 |
| 2002/0167238 A1 * | 11/2002 | Kogure et al. | 310/89 |
| 2003/0090234 A1 * | 5/2003 | Glasgow et al. | 320/107 |
| 2003/0090255 A1 * | 5/2003 | Bassett et al. | 323/284 |

(Continued)

FOREIGN PATENT DOCUMENTS

| DE | 2830973 | | 1/1980 |
| DE | 10317181 A1 | * | 11/2004 |
| WO | 2004/093295 | | 10/2004 |

*Primary Examiner* — Quyen Leung
*Assistant Examiner* — Terrance Kenerly
(74) *Attorney, Agent, or Firm* — Dykema Gossett PLLC

(57) ABSTRACT

An electrical actuator comprising a housing of plastic with a reversible low voltage motor (2), electrical equipment for controlling and supplying the motor with power, where the electrical equipment (19,15) is enclosed in an enclosure (20) of fire resistant material. By this the housing (1) can be designed according to strength, hygiene and sealing, while fire prevention as a result of defect in the electrical equipment can be limited to the separate enclosure.

5 Claims, 3 Drawing Sheets

U.S. PATENT DOCUMENTS

2004/0093969 A1* 5/2004 Nielsen .................. 74/89.23
2005/0155394 A1* 7/2005 Brauchle ................. 68/3 R
2006/0091762 A1 5/2006 Haneball et al.

* cited by examiner

ACTUATOR WITH ELECTRICAL EQUIPMENT ENCLOSED IN A SEPARATE ENCLOSURE MADE OF A FIRE RESISTANT

BACKGROUND OF THE INVENTION

1. Field of the Invention

The invention relates to an electrically driven actuator.

2. The Prior Art

Such actuators are generally used, but for description of the invention it departs from linear actuators for hospital- and care beds. The beds are typically equipped with a number of actuators for raising and lowering the bed altogether as well as raising and lowering of the back and leg section of the madras. The actuators are cable connected to a central control box containing a power supply for connection to the mains, a rechargeable battery pack, a control connected to one or more hand controls and/or fixed control panels on the bed. The power supply's output voltage is typically 24-48 volt and an upper current of up to about 8 amps.

From a general point of view, among these strength, hygiene, sealing and price, the housing is usually made of plastic material. Overriding is chosen a plastic material which ensures sufficient mechanical strength as all or part of the load on the actuator is transmitted through the housing to the mounting fittings of the actuator.

However, for the electrical equipping of the actuators different demands are made including fire safety demands to prevent fire as a result of defect in the electrical equipment. In certain standards and planned standards for electro medical equipment where effects of more than 15 watts can occur, which is the case more places in an actuator, use of fire-resistant material is allotted. As far as the motor itself is concerned, special measures need not be taken, as the motor housing in it itself is of metal and therefore not immediately flammable. A problem may occur by the closing of openings in the ends of the motor housing. The problem with wires can be solved by using wires which in themselves meet the fire technical demands. Left is then, that the electrical equipment typically also contains print, switches, etc., where effects of more than 15 watt can occur. A possibility would be to make the housing from flame-resistant plastic, but this type of plastic either lacks sufficient strength or is so expensive that it cannot be considered a realistic alternative. A metal housing is also not realistic among other things because of the costs.

The object of the invention is to provide a solution to the noted problem.

SUMMARY OF THE INVENTION

According to the invention this by enclosing the electrical equipment in an enclosure made from a fire-resistant material. By doing this the housing can be made from the up to now used plastic materials. As regards the enclosure for enclosing the electrical equipment, it is relatively unbounded. It could be made as a small external enclosure for mounting on the housing, but preferably the enclosure is placed inside the housing. By doing this there are as far as it goes no strength, hygiene, sealing or other demands for the enclosure, as these are met by the housing. The enclosure just has to be made from fire-resistant material, for instance metal. However, for a number of reasons, among these design and price reasons, it is preferred to make it from a special fire-resistant plastic material, more specifically V-O plastic. As the enclosure typically will be relatively small compared to the housing, plastic with good fire-resistant properties can be chosen as the price will not be crucial for the total price of the actuator.

When the electrical equipment comprises at least one printed circuit board, it is expedient to carry out the internal electrical connections with sockets, as this will make it easier to shape the enclosure. Electrical wires with coating of fire-resistant material are used.

By using fire-resistant material for the printed circuit board it can form a part of the wall of the enclosure, which makes the design of the enclosure particularly simple. The printed circuit board can in a particularly simple and mounting-friendly way be clipped to the rest of the enclosure with snap lock connections.

By mounting a socket in the housing for connection of the actuator to the power supply and possibly also an external control, leading of an external cable into the actuator can be avoided. In these cases the internal connection to the electric equipment is carried out with wires with coating of fire-resistant material.

When the motor has a motor housing of steel with in all essentials closed ends it is in itself made in a fire-resistant way and further measures do not need to be taken.

A linear actuator according to the invention will be described in greater detail in the following with reference to the drawings.

DETAILED DESCRIPTION OF THE PREFERRED EMBODIMENT

Figure 1:
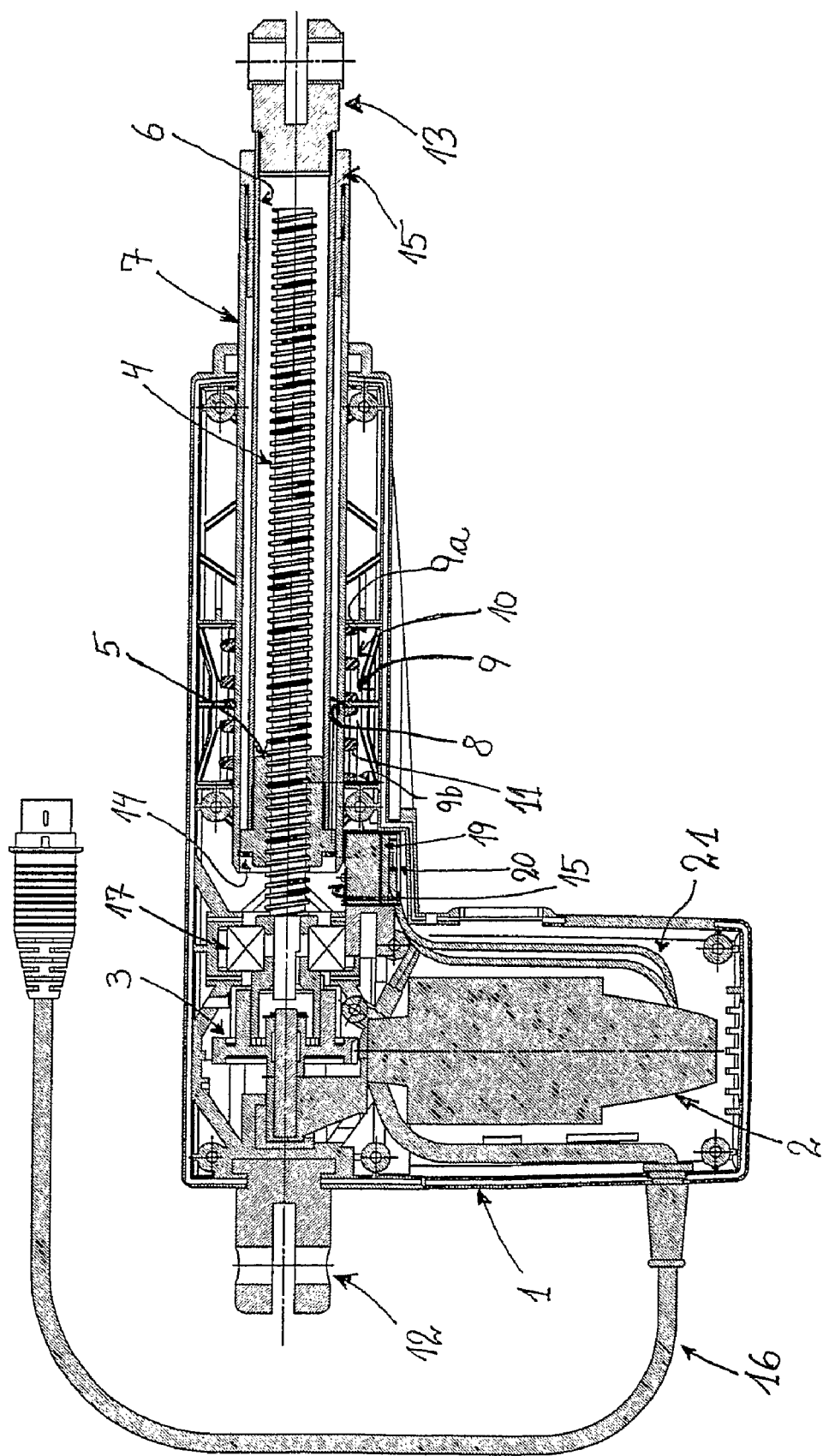
FIG. 1 shows a longitudinal section through the actuator.

As it can be seen from FIG. 1, the actuator consists of a plastic housing 1 in two parts with a reversible electric motor 2, which over a worm gear 3 drives a spindle 4 with a spindle nut 5, whereto a driving rod 6 (also known as inner tube) is connected, surrounded by a protective tube 7, which acts as a guide for the driving rod 6. In one end the spindle 4 is retained in the housing with a bearing 17. The load on the driving rod 6 is guided over the bearing 17 into the housing and from there to a rear mounting 12. The housing is made of plastic, for instance PA6-GF30 which can resist the load. For sealing the joint edges 18 of the housing are carried out as a labyrinth seal with lined sealing.

The protective tube 7 is equipped with a ring 8 located in a round-going groove on the outside of the protective tube. The ring 8 is situated in a groove 9 in the housing. Between the ring 8 and one end 9a of the groove is a spring 10, and a corresponding spring 11 is positioned on the other side between the ring 8 and the other end 9b of the groove. The actuator is assembled in the structure in which it is supposed to be built in by means of a rear mounting 12 at the rear end of the housing 1 and a mounting 13 in the free end of the driving rod 6. When the actuator is built in the mounting 13 at the driving rod will prevent the spindle nut 5 from rotating, so that it moves up and down the spindle 4 instead, depending on the revolving direction of the motor. In the fully retracted position of the driving rod the spindle nut 5 hits a ring 14 situated in a groove inside the protective tube 7. The spindle nut 5 will then push the protective tube 7 into the actuator against the spring 11, which causes a bevelled end of the protective tube 7 to activate a micro switch 15, which cuts off the electric supply to the motor. When the driving rod 6 moves outwards the spring 11 will push the protective tube 7 back into its initial position, where it is being held in a neutral position between the two springs 10,11. When it reaches its extreme position, the spindle nut 5 will hit the edge of an end stop 15 in the protective tube 7, which serves as a guide for the driving rod 6. In this extreme position the spindle nut 5 draws the protective tube 7 out against the spring 10. This causes the innermost end of the protective tube to let go of a second micro switch (hidden behind micro switch 15), which cuts off the electric supply to the motor. Both micro switches are mounted on a joint printed circuit board 19 and connected to a wire 16 with a DIN plug 16 for connection of a control box with power supply and operating circuit. When the spindle nut 5 moves inwards, the protective tube 7 is pushed back into the initial position by the spring 10.

The printed circuit board 19 with micro switches belonging to it is enclosed in a separate enclosure 20 of fire-resistant plastic V-O, naturally with openings for the key of the micro switches. The enclosure can have relatively thin walls as it does not have to resist any mechanical load worth mentioning, but just functions as a protective coat around the printed circuit board. The cable 16 and the wires 21 inside the housing, which connects the motor to the printed circuit board 19, have a plastic coating of fire-resistant material so that they in themselves meet the fire safety requirements.

Figure 2:
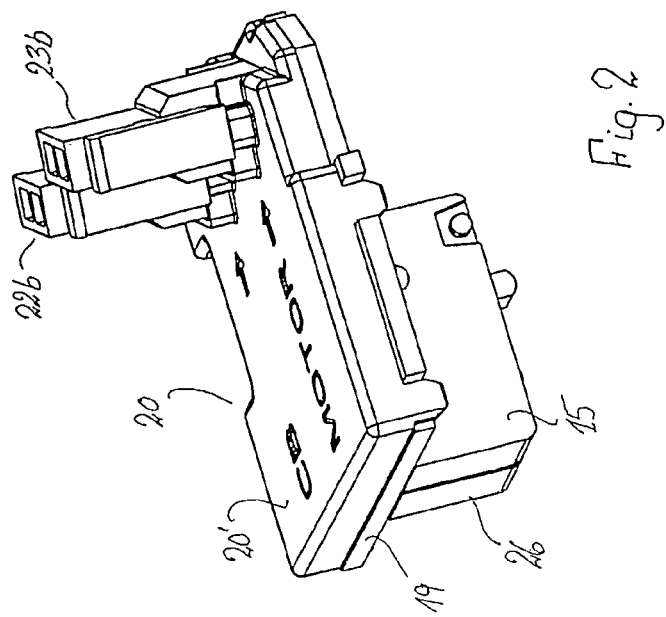
FIG. 2 shows a view of enclosed printed circuit board.
Figure 3:
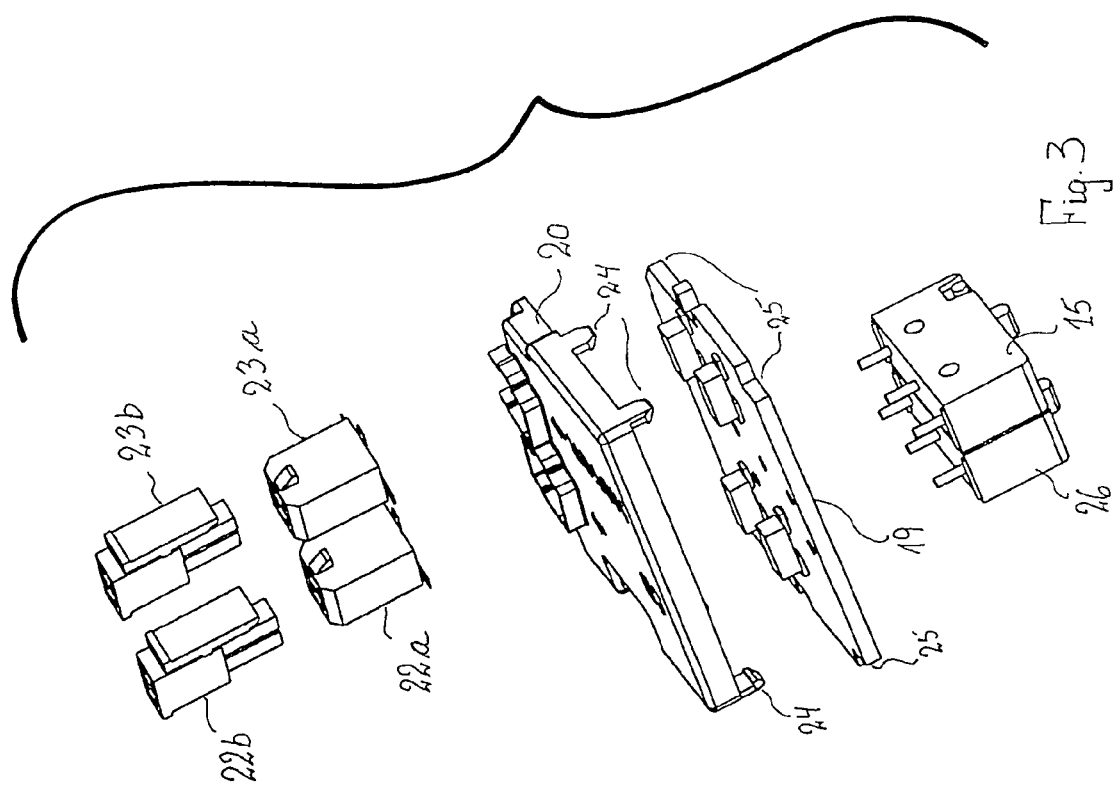
FIG. 3 shows an exploded view of the printed circuit board in FIG. 2.

Instead of soldering the wires on the printed circuit board the connection can be made with internal plugs 22a, 22b; 23a, 23b likewise made of V-O material, which also gives advantages by the mounting. Referring to FIGS. 2 and 3 the enclosure of the printed circuit board 19 can also be simplified by making it of a fire-resistant material and being a part of the enclosure. The upper part of the enclosure 20' is then a cap with snap locks 24. In the edges the printed circuit board there are groves 25 for the legs 24 so that the printed circuit board 19 can be snapped together with the cap 20'. The micro switches 15,26 mounted on the outside of the printed circuit board are made of V-O plastic material.

As to the motor 2, it is surrounded by a steel motor housing with in all essentials closed ends, so that the motor in itself meets the fire safety requirements.

Figure 4:
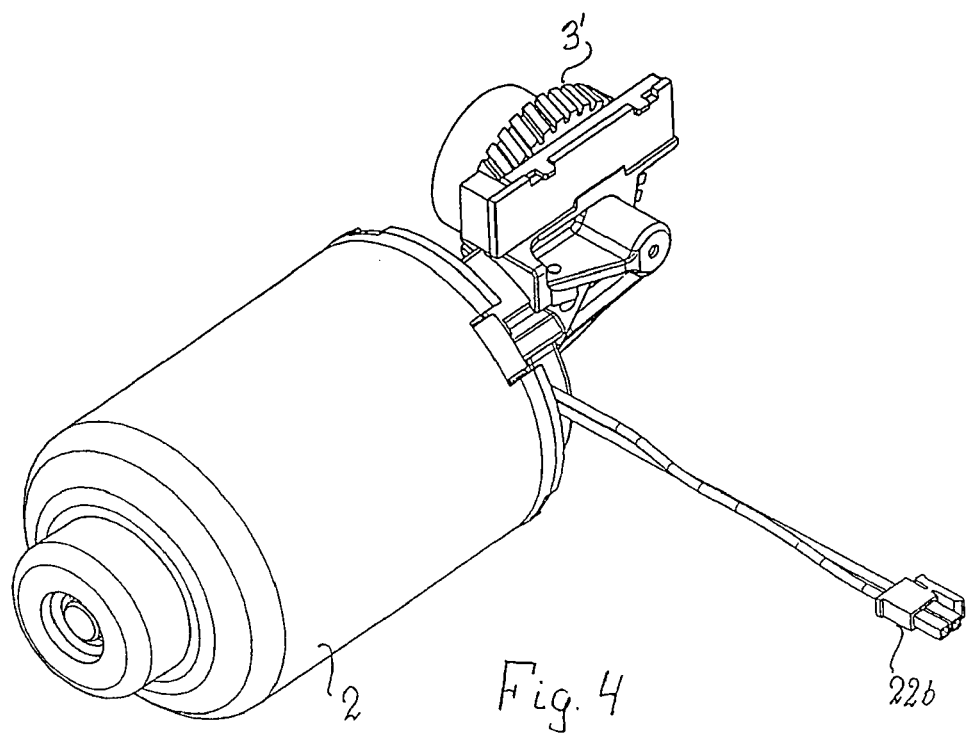
FIG. 4 shows motor with worm wheel and circuit for position detection.
Figure 5:
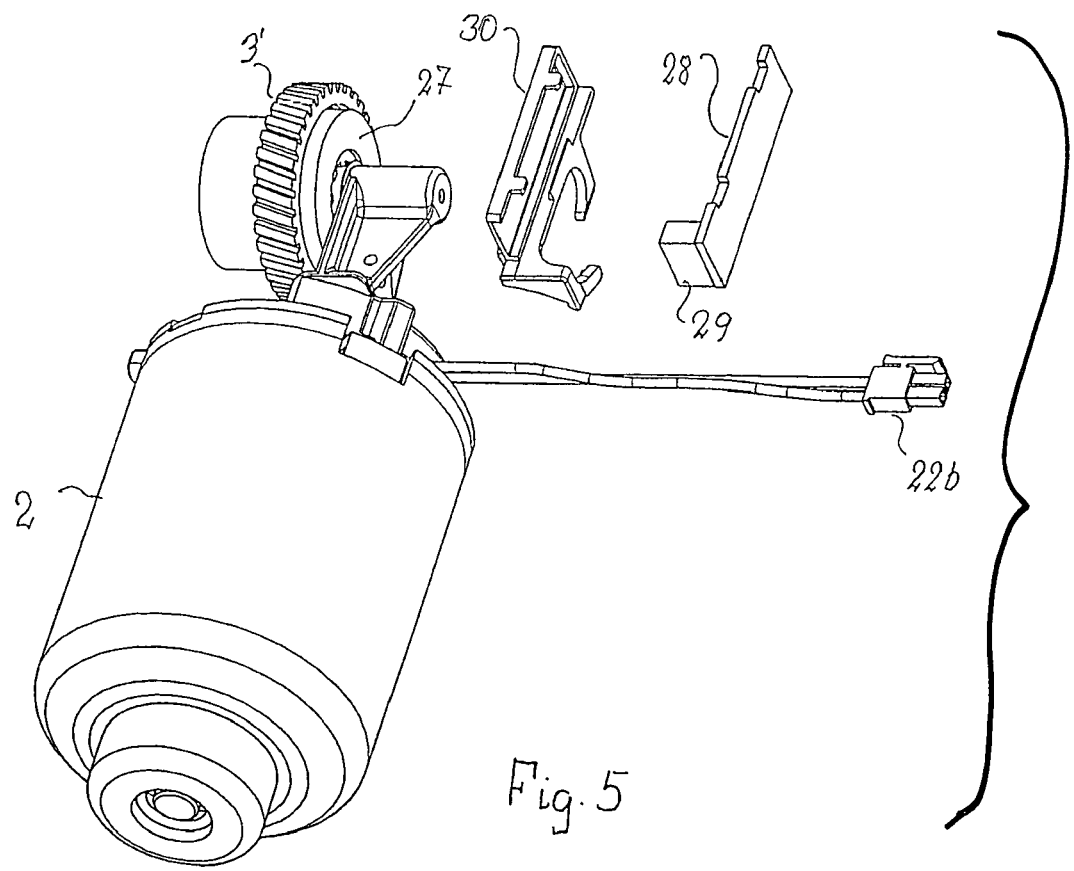
FIG. 5 shows the same as FIG. 4 with the position detection shown separately.

FIGS. 4 and 5 of the drawing show the motor 2 with worm wheel 3' with a position determining arrangement for the driving rod 6, which works by scanning the rotations of the worm wheel. For this purpose the worm wheel is equipped with a magnetic ring 27 with four poles. In connection herewith is a print 28 with Hall-elements registering every time one of the poles of the magnetic ring passes by. From the number of pulses from the Hall-elements and the thread pitch of the spindle the position of the driving rod can be determined. The print 28 is also here made of a fire resistant material and the same goes for a socket 29 mounted on the print. The component side of the print is covered by an upper part 30, which is held in a snap lock connection with the print.

With these arrangements an actuator with high fire safety is provided using small means. Another advantage of the invention is that it can be implemented in already existing actuator constructions, as it only requires small measures.

Even though the invention is described in the light of a linear actuator, it can, of course, also be used in connection with rotary actuators, cf. for instance WO 01/17401 A1 Linak A/S.

The invention claimed is:

1. A linear actuator comprising:
   an outer housing made of plastic material,
   a reversible electric low voltage motor embedded in the outer housing,
   a spindle and spindle nut assembly,
   a driving rod with an internal first end connected to the spindle nut,
   a protective tube surrounding the driving rod,
   a plug for external connection, and
   a separate enclosure consisting of a fire-resistant material located within the outer housing, said separate enclosure comprising a cap and a wall formed in part by a printed circuit board for controlling the electric motor, said cap including snap lock elements that are one piece therewith for extending through grooves in said printed circuit board to snap lock said cap and printed circuit board together.

2. The linear actuator according to claim 1, wherein the plastic material is V-O plastic.

3. The linear actuator according to claim 1, wherein electrical connections to said printed circuit board are made with plugs and with wires having a coating of fire-resistant material.

4. The linear actuator according to claim 1, wherein the plug is mounted in the outer housing, while connection to the printed circuit board and the motor is done with wires having a coating of fire-resistant material.

5. The linear actuator according to claim 1, wherein the motor has a motor housing made of steel and has essentially closed ends.

* * * * *